2

United States Patent Office 3,307,965
Patented Mar. 7, 1967

---

3,307,965
ARTICLE WITH PLURAL COATS OF A COPOLYMER HAVING DIFFERENT $T_i$ VALUES AND PROCESS OF PRODUCING THE SAME
Maurice I. Seifer, Levittown, and Chien-Pen Lo, Philadelphia, Pa., assignors to Rohm & Haas Company, Philadelphia, Pa., a corporation of Delaware
No Drawing. Filed Dec. 10, 1963, Ser. No. 329,389
6 Claims. (Cl. 117—76)

This invention concerns an improved multi-layer solvent-resistant coating for flexible fibrous materials, such as textiles, leather, and paper for the purpose of waterproofing such materials.

It has heretofore been proposed to include various thermosetting materials such as melamine-formaldehyde condensates in coating compositions based on polyvinyl resins but in general such materials suffer from one or more difficulties such as poor compatibility, inadequate capacity to render the coating insoluble, or excessive stiffening action when applied in sufficient proportion to give adequate resistance to solvents.

It has also been suggested to use coating compositions formed of mixtures of (a) a glycidyl methacrylate copolymer and (b) a cellulose ester, such as cellulose acetate propionate or cellulose acetate butyrate. Products having good solvent resistance, flexibility, and waterproofness are obtained; however the cellulose esters have an undesirable odor and it is difficult to make up solutions of appropriate concentration for coating purposes without using volatile alcohols of low flash point and high toxicity.

It is an object of the present invention to provide a coating composition which is adapted to be cured to a solvent-resistant condition without appreciably reducing the flexibility of the substrate to which it is applied. Another object of the present invention is to provide an improved multiple-layer coating system for such flexible fibrous articles. Another object is to provide a process of coating fibrous substrates with compositions comprising a copolymer of thermosettable type which does not require the use of adjuvants having an objectionable odor and does not require solvents of excessively toxic or flammable character, and hence the necessity to take special precautions against fire and poisoning hazards can easily be reduced or eliminated. Other objects and advantages will be apparent from the description hereinafter.

In accordance with the present invention, it has been discovered that fibrous materials can be provided with a water-resistant finish which is either water-repellent or waterproof, is resistant to dry-cleaning solvents, such as carbon tetrachloride and perchloroethylene, and does not stiffen the material objectionably, without the disadvantages of the finish systems heretofore used by applying in succession coating compositions containing a copolymer of monoethylenically unsaturated monomers comprising about 1% to 10% by weight of a compound of the formula

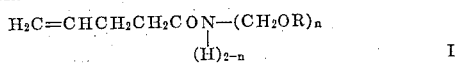

$$H_2C=CHCH_2CH_2CON-(CH_2OR)_n$$
$$(H)_{2-n}$$

I wherein R is selected from the group consisting of H and alkyl having 1 to 6 carbon atoms, and $n$ is a number having an average value of about 0.5 to 2.0 and preferably having an average value of about 1.

The monomer of Formula I in which R is H may be made by reacting 4-pentenamide with formaldehyde or a source of formaldehyde such as paraformaldehyde at a temperature of about 20° C. to 90° C., preferably about 30 to 60° C., in an aqueous medium, or an organic medium, such as an alcoholic medium, containing either an acid or an alkaline catalyst. Preferably, an alkaline catalyst is used, such as an alkali metal hydroxide or carbonate, of which sodium carbonate may be of typical practicality, the pH being from about 7.5 to 10. The proportion of formaldehyde may be from about 0.5 mol to 2 mols or higher even up to 4 mols, all based on one mol of the pentenamide. The product is water-soluble and can be isolated, at least partly, to provide a composition within the formula defined, such as the N-methylol-4-pentenamide, by careful dehydration under vacuum, by salting-out with selected solvents, and/or crystallization. For most purposes, however, isolation of the condensate obtained from the pentenamide and formaldehyde is unnecessary, and merely adds to the expense involved.

The monomers of the formula in which R is an alkyl group may be prepared by carrying out the reaction with the formaldehyde in an aqueous or an organic solvent medium containing at least one alcohol, the amount of water being relatively small, such as 15% or less of the solvent medium. The amount of alcohol used may be at least about 0.5 mol to 2 mols per mol of pentenamide. Excess alcohol up to 10 or more mols may be used. Products of Formula I in which R is an alcohol having from 1 to 4 carbon atoms and $n$ is 1 are the preferred alkylated products.

The polymers of the compound of Formula I may be prepared by copolymerization thereof with other monomers in solution in such solvents as hydrocarbons, e.g., toluene, xylene esters, e.g., methyl acetate, ethyl acetate, butyl acetate, 2-ethoxyethyl acetate, 2-ethoxyethyl propionate, 2-butoxyethyl acetate, ketones, such as acetone, methyl isobutyl ketone, ethers such as dioxane, the methyl, ethyl or butyl monoethers of ethlene glycol, dimethylformamide, any of the above-mentioned alcohols, or any other organic solvent in which the monomers and polymer obtained therefrom are soluble Mixtures of these solvents are also useful.

The polymerization is effected with the aid of a free radical initiator or catalyst, such as an organic or inorganic peroxide catalyst or an azo catalyst. From 0.1% to 3% or more of the initiator or catalyst may be used, based on the total weight of the monomers. Examples of organic peroxide catalysts that may be used include benzoyl preoxide, acetyl peroxide, caproyl peroxide, butyl perbenzoate, butyl hydroxide. Examples of azo catalysts include azodiisobutyronitrile, azodiisobutyramide, dimethyl or diethyl or dibutyl azodiisobutyrate, azobis($\alpha,\nu$-dimethylvaleronitrile), azobis($\alpha$ - methylbutyronitrile), azobis($\alpha$-methylvaleronitrile), dimethyl or diethyl azobismethylvalerate, and the like. The direct product of the polymerization is a viscous solution of the polymer. The molecular weight may be controlled in conventional fashion by control of initiator concentration, temperature, use of chain regulators, etc. In general, the copolymers preferably have molecular weights such that at 40% concentration in the organic solvent in which the copolymer is to be applied, the solution has a viscosity in the range of about 80 to 500 poises at 25° C. and most advantageously from about 150 to 300 poises.

The monomers than can be copolymerized with the N-substituted 4-pentenamide of Formula I include acrylonitrile, methacrylonitrile, vinyl esters, such as vinyl acetate, vinyl butyrate, vinyl propionate, and vinyl laurate, vinylidene chloride, vinyl chloride, ethylene, isobutylene, vinylaromatic hydrocarbons, e.g., styrene, α-methylstyrene, vinyltoluene, esters of α,β-monoethylenically unsaturated acids with alcohols having 1 to 18 carbon atoms and preferably 1 to 4 carbon atoms, such as dimethyl itaconate, methyl half ester of itaconic acid, the corresponding ethyl, propyl, and butyl esters, the di- and mono-esters of maleic acid, such as butyl acid maleate, the esters of acrylic acid with $C_1$ to $C_{18}$- alcohols and especially the $(C_1-C_4)$alcohols, e.g. methyl acrylate, ethyl acrylate, butyl acrylate, 2-ethylhexyl acrylate, and the esters of methacrylic acid with $C_1$ to $C_{18}$- alcohols, especially the $(C_1-C_4)$-alcohols e.g., methyl methacrylate, ethyl methacrylate, and butyl methacrylate.

The copolymers may contain up to 3%, but preferably not over 1% by weight of an $\alpha,\beta$-monoethylenically unsaturated acid, such as acrylic, methacrylic, 4-pentenoic or itaconic acid. The copolymers may contain a small amount of acrylamide, methacrylamide, 4-pentenamide, N-methylolacrylamide, N-methylolmethacrylamide, or the alkylation products of the last two monomers with an alcohol having 1 to 4 carbon atoms; however, the total amount of these amide monomers should not be over 5% by weight of the entire copolymer weight and should not exceed the weight of the monomer of Formula I present in the copolymer The process of the present invention involves applying a subcoating of a copolymer of a compound of Formula I which copolymer has an apparent second order transition temperature, $T_i$, of about $-10$ to $-50°$ C. and preferably $-18$ to $-30$ C., and subsequently applying an outer coating of a similar copolymer except that it has a $T_i$ of about 10 to 40° C., preferably about 15 to 30° C.

The $T_i$ value referred to herein is the transition temperature or inflection temperature which is found by plotting the modulus of rigidity against temperature. A convenient method for determining modulus of rigidity and transition temperature is described by I. Williamson, British Plastics, 23, 87–90, 102 (September 1950). The $T_i$ value here used is that determined at 300 kg./cm.$^2$.

While the simplest embodiment involves applying a single base coat or subcoat as defined followed by a single outer coat (in this case, the topcoat) of the copolymer having a higher $T_i$ value than that of the subcoating copolymer, variations may be employed. For example, two or more applications of the subcoating may be employed with a single outer coating (or topcoat) or with several layers of the outer coating. Of course, a single subcoating of the low $T_i$ copolymer may be used with two or more outer coatings of the higher $T_i$ copolymer. Again, the application of the low $T_i$ subcoating may be followed by application of an intervening coating of a copolymer having a higher $T_i$, either still in the $-10$ to $-50°$ C. range or between the $-10°$ upper limit thereof and the 10° C. lower limit of the outer coating or coatings that is or are subsequently applied. Again, in any of these modifications, a plurality of sub-coatings in the $-10$ to $-50°$ C. range may be applied and they may have the same or different $T_i$ values. Likewise, a plurality of outer coating copolymers having either the same or different $T_i$ values may be applied, and intervening coatings may have the same or different $T_i$ values falling either in the given or the subcoatings $T_i$ range, the $T_i$ range given for the outer coatings, or in the intervening gap from $-10$ to $+10°$ C.

All coats are applied from organic solvent solutions. The concentration of the solutions may be from 20 to 45% by weight of the copolymer. Small amounts of pigments and dyes may be incorporated. While no catalyst is needed to cure the copolymers applied to water-resistant condition, aging and/or application of heat for drying serving to cure them, nevertheless, accelerated curing may be effected by incorporating into the coating solution, a small amount of an acidic catalyst, such as about 0.1 to 1.5% by weight of the copolymer present in the coating composition. Examples of suitable catalysts include butyl phosphoric acid, p-toluene sulfonic acid, oxalic acid, maleic acid, the mono-salt of maleic acid with an amine, such as triethylamine or triethanolamine, the salts of various amines, such as the hydrochloride, the hydroacetate, or the maleate of 2-methyl-2-aminopropanol-1, diethanolamine, and so on.

Any suitable method of applying the coating to the fabric may be employed such as roll-coating, knife-coating, spraying, brushing, or dipping. The concentration and viscosity are, of course, adjusted to the particular method intended to be used in applying the coatings to the substrates.

The total weight of the multi-layer coating or finish applied may be as low as ½ ounce per square yard of finished area and as high as 3 ounces or more per square yard. Most applications fall in the range of ¾ to 2 ounces per square yard.

After application of the coating composition, it is merely necessary to evaporate the solvent to dry the coated material. This may be done in any suitable manner such as exposure to ambient atmosphere at room temperature, heating, such as up to 150° F., dielectric heating, infrared lamps, etc.

If desired, each of the coatings is subjected to a baking step to cure the copolymer on the coated substrate. Preferably, the final drying is followed by a curing or baking which may be effected at a temperature of 220° to 450° F. for a period of time that may be anywhere from about ½ minute to ½ hour or longer, the shorter time generally being used at the higher temperature and vice versa.

The finish may be applied to paper, leather, or to textile fabrics, such as woven, knitted, knotted, "non-woven" webs (carded or random laid) either single or multiple-thickness. The textile material may be formed of any suitable material, such as cotton, wool, silk, linen, rayons, cellulose esters, such as cellulose acetate, polyamide nylon, both 66 and caprolactam types, polyesters, such as polyethylene glycol terephthalate, casein, and any mixtures thereof.

The coatings may be applied to all sorts of textile fabrics, such as garments needing water-proofing. Thus, raincoats formed of nylon, vinyl resins, Dacron, cotton, rayon, or mixtures thereof can be rendered resistant to dry-cleaning as well as resistant to water and grease by the coating system herein disclosed.

The coatings are also useful for water-proofing or rendering water-repellent umbrellas, awnings, automobile seat-covers, knapsacks, and other items of textile fabrics. They may be used as well for the water-proofing of leather used in shoes, briefcases, and luggage of all sorts. Because of their grease-proofness and solvent resistance as well as their water-repellency, the coatings are useful as finishes for paper including paperboards, such as may be used as protective covers for books and the like.

The application of the undercoat or base coat prior to the application of the second coat is quite important. The composition first applied is relatively soft, forms an excellent bond with the base, and provides a high degree of flexibility in immediate proximity to the surfaces of the fibers upon which the base coat is applied. The top coat is, as compared to the base coat, quite free from tackiness and provides a good exposed surface substantially free of grab, that is of the tendency to cling to any surface upon which the coated article is pressed. By providing a copolymer containing polymerized units of a monomer of Formula I in both coatings, resistance to dry-cleaning is imparted throughout the entire thickness of the coating. At the same time, this solvent-resistance is obtained without sacrifice of flexibility and draping qualities of the base particularly when it is a textile fabric forming part of a garment.

In the examples which are illustrative of the invention, the parts and percentages are by weight unless otherwise specifically indicated.

EXAMPLE A

*Preparation of N-methylol-4-pentenamide*

In a flask was placed 312 grams (3.15) moles of 4-pentenamide, 183 grams (5.82 moles available as HCHO)

of paraformaldehyde (96%), 80 grams of methanol and 20 grams of 1.0 N methanolic potassium hydroxide. The reaction mixture was warmed to 60°–70° C. for several hours during which time it fused. The reaction mixture was cooled to oven temperature, 400 ml. of ether added, followed by cooling in an ice bath. N-methylol-4-pentenamide crystallized which was separated by filtration, 127 grams, M.P. 72–73°. Concentration of the filtrate afforded a residue from which additional N-methylol-4-pentenamide (134 grams, M.P. 70.5–72°) was obtained after recrystallization from ether.

EXAMPLE B

*Preparation of N-methoxymethyl-4-pentenamide*

In a flask was placed 85 grams (0.66 moles) of N-hydroxymethyl-4-pentenamide, 150 mls. (120 g.) of methanol and sufficient 12% hydrogen chloride in methanol to bring the solution to pH of 3.0. The reaction mixture was allowed to remain at room temperature overnight, neutralized with sodium bicarbonate, filtered and filtrate distilled at reduced pressure. There was collected 83 grams (88%) of N-methoxymethyl-4-pentenamide boiling at 122° C./4.3 mm. Hg to 120° C./3.9 mm. Hg, $n_D^{25}$ 1.4592, M.P. 13–14° C.

EXAMPLE C (a) *Preparation of N-butoxymethyl-4-pentenamide.—* In a flask was placed 198 grams (1.38 moles) N-methoxymethyl-4-pentenamide, 207 grams (2.8 moles) n-butanol and sufficient concentrated $H_3PO_4$ to bring the reaction mixture to pH 2.0–3.0. Methanol was distilled from the reaction mixture followed by neutralization to pH 8.0 with sodium methoxide. Distillation produced N-butoxymethyl-4-pentenamide, 125 grams, boiling range of 116° C./0.5 mm. Hg–123° C./0.6 mm. Hg, $n_D^{25}$ 1.4550.

(b) N-ethoxymethyl-4-pentenamide was prepared in essentially the same way as described in (a) except that the n-butanol was replaced by 130 g. of absolute ethyl alcohol.

(c) N-hexoxymethyl-4-pentenamide was prepared in the same way as in part (a) except the n-butanol was replaced by 285 grams of n-hexanol.

EXAMPLE D

*Typical polymerization procedure*

The polymerization apparatus consisted of a 2-liter three-neck flask equipped with a stirrer, a reflux condenser, an addition funnel, a thermometer, and a nitrogen delivery tube. A slow current of dry nitrogen was passed above the liquid during the entire polymerization process. The flask could be heated by a hot water bath or cooled by a cold water bath.

To the polymerization flask was charged 233 parts of butyl acetate and the solvent was heated to 80° C. To this was added during two hours, a mixture of

| | Parts |
|---|---|
| Ethyl acrylate | 336 |
| N-methoxymethyl-4-pentenamide | 14 |
| Azobisisobutyronitrile | 0.14 |

The temperature of the batch was maintained at 75–90° C. Additional charges of 1.92 parts of azobisisobutyronitrile in 53 parts of xylene were added in five equal portions after 3.5, 4, 4.5, 5, and 5.5 hours. At the end of 7 hours, 180 parts of xylene was added and the mixture was cooled. The clear and colorless solution of the copolymer of about 96% ethyl acrylate and about 4% N-methoxymethyl-4-pentenamide has a $T_i$ of about −14° C., was found to contain 39.5% solids, and had a viscosity of 190 poises at 25° C.

In the following examples, the procedures used in washing, drycleaning, and testing for waterproofness were as follows:

*Wash.*—Household wash in an RCA Whirlpool washer at 130° F. with ⅓ cup of Tide, a commercial detergent, the main components of which are alkali metal phosphate, alkylaryl sulfonate, sodium sulfate, and tallow sulfate, and a 3-lb. ballast. One cycle consists of about 45 minutes of washes, rinses, and spin drying.

*Dryclean.*—AATCC Launder-Ometer at room temperature with a charged solution of perchloroethylene (PCE) or trichloroethylene (TCE). One cycle consists of a 25-minute tumbling followed by a 5-minute rinse in pure solvent.

*Waterproof.*—AATCC Hydrostatic Test 18–1952, in which the ability of a coated sample to support a constantly rising water column was measured. The height reached when 3 drops of water appeared on the upper side of the fabric was recorded in centimeters of water. The maximum height attainable on the instrument is 100 cm.

EXAMPLE 1

A solution in a solvent consisting of 50% butyl acetate and 50% xylene containing dissolved therein 40% of a copolymer, having a $T_i$ value of about −15° C., of 95% ethyl acrylate, 2% 4-pentenamide, and 3% N-methylol-4-pentenamide was prepared in a manner similar to that described in Example D using the appropriate monomers and solvents in the proportions just mentioned. Then 1% (based on the copolymer solids) of n-butyl acid phosphate was added to the solution and the resulting solution was applied to a heat set, finish-free, lightweight nylon taffeta rainwear fabric weighing 2.5 oz. per square yard and having a count of 160 x 80. Application of the catalyzed polymer was by a floating knife-coater at a rate of about 0.4 oz. per square yard. The coated fabric was dried and cured by heating for 5 minutes at 260° F. Then a topcoating was applied and heated to dry and cure in the same way as the first or base coat using a solution in the same solvent containing 40% of a copolymer of 65% ethyl acrylate, 30% methyl methacrylate, 2% 4-pentenamide, and 3% N-methylol-4-pentenamide having a $T_i$ value of about +15° C.

A piece of the finished fabric was washed five times and was completely waterproof as indicated by supporting a 100-cm. column of water without the appearance of 3 drops of water on the upper side of the fabric. A piece drycleaned 5 times in PCE was also completely waterproof. A piece drycleaned once in TCE was completely waterproof. Even after drycleaning 5 times in TCE, the column supported was 80 cm. A piece prepared as above and then heated an additional 3 minutes at 320° F. was completely waterproof after 5 drycleanings in TCE.

EXAMPLE 2

To the 39% copolymer solution obtained in Example D, there was added 1% (based on copolymer solids) of the triethylamine monosalt of maleic acid. This solution was applied as the base coat and heated to dry and cure as in Example 1. Then a topcoat was applied and heated to dry and cure as in Example 1, using as the coating composition a 40% solution in a 50:50 butyl acetate:xylene solvent of a copolymer, having a $T_i$ of about 30° C., of 48% ethyl acrylate, 48% methyl methacrylate, and 4% of N-methoxymethyl-4-pentenamide to which 1% (on copolymer) of the same acidic catalyst was added. Excellent waterproof coatings are obtained.

EXAMPLE 3

To a 39% solution in 50:50 butylacetate:xylene solvent of a copolymer of 96% ethyl acrylate and 4% of N-butoxymethyl-4-pentenamide, having a $T_i$ of about −15° C. there was added 1% (based on copolymer solids) of oxalic acid. This was applied to a nylon taffeta as a base coat as in Example 1 and heated for 5 minutes at 280° F. Then a topcoat was applied and heated 5 minutes at 280° F. using the same topcoating solution as in Example 2. Excellent waterproofed fabric was obtained.

EXAMPLE 4

(a) Example 1 was repeated using as the copolymer of the base coating, a copolymer having a $T_i$ below −30° C., of 95% of butyl acrylate and 5% of N-methylol-N-methoxymethyl-4-pentenamide and the same topcoating solution as in Example 1. Excellent waterproofing was obtained.

(b) Example 1 was repeated using as the copolymer of the base coating, a copolymer having a $T_i$ below −28° C., of 95% of butyl acrylate and 5% of N,N-dimethoxymethyl-4-pentenamide and the same topcoating solution as in Example 1. Excellent waterproofing was obtained.

We claim:

1. An article of manufacture comprising a flexible fibrous base carrying on at least one surface thereof a multi-layer coating comprising a subcoating comprising a copolymer, having an apparent second order transition temperature of −10° C. to −50° C. of copolymerizable monoethylenically unsaturated monomers comprising 1 to 10% by weight of at least one monomer of the formula $$H_2C{=}CHCH_2CH_2CON{-}(CH_2OR)_n$$
$$\phantom{H_2C{=}CHCH_2CH_2CON}(H)_{2-n} \qquad \text{I}$$

wherein R is selected from the group consisting of H and alkyl having 1 to 6 carbon atoms, and $n$ is a number having an average value of about 0.5 to 2.0, and up to 99% by weight of at least one ester of acrylic acid with a saturated alcohol having 1 to 18 carbon atoms, and an outer coating of a copolymer, having an apparent second order transition temperature between 10° and 40° C., of copolymerizable monoethylenically unsaturated monomers comprising 1 to 10% by weight of at least one monomer of the aforesaid formula and up to 99% by weight of at least one ester of acrylic acid with a saturated alcohol having 1 to 18 carbon atoms.

2. An article as defined in claim 1 in which the subcoating is in adherent contact to fibers of the fibrous base and the outer coating is a topcoat superposed on the subcoating.

3. An article according to claim 1 in which the base is a textile fabric.

4. An article according to claim 1 in which the base is a paper.

5. An article according to claim 1 in which the base is a leather.

6. A method of rendering a flexible, fibrous article water-resistant which comprises the steps of applying to at least one surface of the article a solution in an organic solvent of a copolymer having an apparent second order transition temperature of −10° C. to −50° C., of copolymerizable monoethylenically unsaturated monomers comprising 1 to 10% by weight of at least one monomer of the formula $$H_2C{=}CHCH_2CH_2CON{-}(CH_2OR)_n$$
$$\phantom{H_2C{=}CHCH_2CH_2CON}(H)_{2-n} \qquad \text{I}$$

wherein R is selected from the group consisting of H and alkyl having 1 to 6 carbon atoms, and $n$ is a number having an average value of 0.5 to 2.0, and up to 99% by weight of at least one ester of acrylic acid with a saturated alcohol having 1 to 18 carbon atoms, drying the coated article, subsequently applying a solution in an organic solvent of a copolymer, having an apparent second order transition temperature between 10° and 40° C., of copolymerizable monoethylenically unsaturated monomers comprising 1 to 10% by weight of at least one monomer of the aforesaid formula and up to 99% by weight of at least one ester of acrylic acid with a saturated alcohol having 1 to 18 carbon atoms, and subsequently drying and heating the article to a temperature of at least 150° F. to render the coatings resistant to solvents.

References Cited by the Examiner

UNITED STATES PATENTS

| | | | |
|---|---|---|---|
| 2,828,224 | 3/1958 | Alps et al. | 260—901 X |
| 2,874,066 | 2/1959 | McLaughlin et al. | 117—155 |
| 2,879,178 | 3/1959 | McWherter et al. | 117—76 |
| 2,923,653 | 2/1960 | Matlin et al. | 117—76 |
| 2,940,950 | 6/1960 | Gusman | 260—901 |
| 3,230,204 | 1/1966 | Chloupek | 260—901 |

WILLIAM D. MARTIN, *Primary Examiner.*

R. HUSACK, *Assistant Examiner.*